(No Model.)
L. H. BURNETT.
ATTACHMENT FOR WATER CLOSETS.
No. 293,305. Patented Feb. 12, 1884.
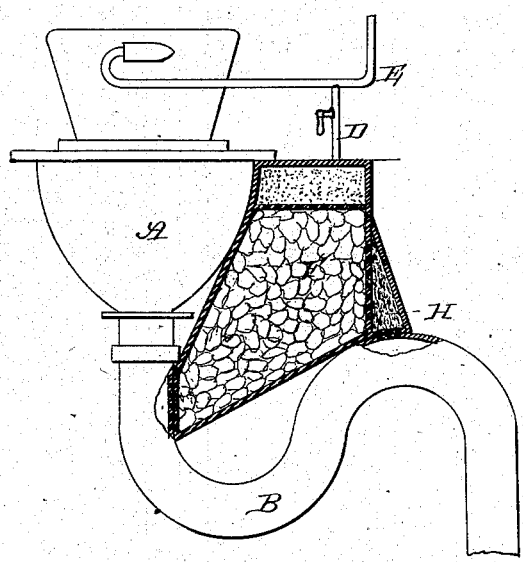

UNITED STATES PATENT OFFICE.

LUTHER H. BURNETT, OF CHICAGO, ILLINOIS.

ATTACHMENT FOR WATER-CLOSETS.

SPECIFICATION forming part of Letters Patent No. 293,305, dated February 12, 1884.

Application filed April 4, 1883. (No model.)

*To all whom it may concern:*

Be it known that I, LUTHER H. BURNETT, of Chicago, in the county of Cook and State of Illinois, have invented certain new and useful Improvements in Attachments for Water-Closets; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for water-closets; and it consists in the combination of a box having three compartments, in one of which is placed a chemical, which is slowly dissolved by water which is made to trickle through it, and which is placed just above the compartment in which powdered charcoal is placed, and a third compartment, which serves simply as a pipe to conduct the gases of all kinds from the pipe into the charcoal, as will be more fully described hereinafter.

The object of my invention is to provide an antiseptic attachment for water-closets, by means of which all of the obnoxious gases which arise from the sewer and other sources will be robbed of all their poisonous qualities, and all deleterious emanations from the sewers are absorbed, decomposition arrested, and all germ-life destroyed.

The accompanying drawing represents a side elevation of my invention partly in section.

A represents a water-closet bowl, of any desired shape, size, or construction which may be preferred, and to which the usual pipe, B, is connected, the pipe having a bend or bends formed in it for the purpose of forming a trap.
Attached to one side of the water-closet is a frame or box, which is divided by suitable partitions into three different compartments. In the upper one is placed a suitable chemical which has antiseptic qualities, and which will slowly dissolve under the influence of water, which is kept trickling through it from the short pipe D, which is connected with the main supply-pipe E. In this short pipe is placed a suitable stop-cock, for the purpose of stopping the flow through the pipe whenever so desired. The water may be sprayed or introduced into this chamber in any manner that may be preferred. This box containing the chemical is placed upon the top of the box F, which will be filled with powdered charcoal or any other similar absorbent material, and which box has its lower end taper down, as shown, and connected directly with the waste-pipe. Through the top of the bend in the waste-pipe, or at any other suitable point in the pipe, there is made a suitable opening, and this opening connects directly with the third box or chamber, H. The upper end of this chamber is connected directly with the box which is filled with charcoal, so that all of the foul gases which arise from the sewer or from other sources will pass through this box H, and pass directly into the box filled with charcoal, or into the box which is filled with the chemical through the fine perforations which are made in its bottom.

The operation of my invention is as follows: The chemical having been placed in this box which is provided with a perforated bottom, and the water turned on through the short pipe, becomes slowly dissolved and flows down through the charcoal into the bend of the waste-pipe, where it remains. This dissolved chemical, of whatever kind, prevents all decay, and destroys all germ-life. The foul gases, arising from whatever source, in their passage through the powdered charcoal, which is more or less saturated with the chemical, pass back into the pipe again, but only after they have been robbed of all their poisonous qualities. There is nothing that will prevent sewer-gas rising through the waste-pipe. If there were no other outlet for the gas, it would force a passage through the water in the bend of the waste-pipe, thence through the trap and the bowl, out into the building, retaining all of its poisonous vapors and disease-breeding germs. As the outlet through the chamber filled with charcoal offers less resistance for the escape of this gas than by the way of the water in the bend, it would naturally pass through the charcoal, and during its passage ammoniacal gases and all other poisonous emanations from the sewer are absorbed, all decomposition is arrested, and all germ-life is destroyed.

Having thus described my invention, I claim—

1. In a water-closet, the combination of a chamber to receive a suitable chemical, and having a perforated bottom, and a pipe for conducting water to the chamber to dissolve the chemical, with a box which is filled with charcoal, through which the dissolved chemical flows into the waste-pipe, substantially as shown.

2. The combination of a chamber to receive a chemical, and having a perforated bottom, a pipe for conducting water into the chamber for the purpose of dissolving the chemical, and a chamber, F, for receiving powdered charcoal, and which is connected at its lower end with the waste-pipe, with a chamber, H, through which the gases are conducted from the waste-pipe into the chamber containing charcoal, substantially as shown and described.

In testimony whereof I affix my signature in presence of two witnesses.

LUTHER H. BURNETT.

Witnesses:
 WILLIAM H. CASS,
 THOMAS J. MCGRATH.